Dec. 12, 1967   F. W. R. STARP   3,357,333
PHOTOGRAPHIC SHUTTER WITH SWING-THROUGH SHUTTER BLADES
Filed May 12, 1965   4 Sheets-Sheet 1

INVENTOR.
Franz W. R. Starp
BY
Arthur A. March
ATTORNEY

Dec. 12, 1967  F. W. R. STARP  3,357,333
PHOTOGRAPHIC SHUTTER WITH SWING-THROUGH SHUTTER BLADES
Filed May 12, 1965  4 Sheets-Sheet 2

INVENTOR.
Franz W. R. Starp
BY
Arthur A. March
ATTORNEY

INVENTOR.
Franz W. R. Starp
BY
Arthur A. March
ATTORNEY

Dec. 12, 1967 — F. W. R. STARP — 3,357,333
PHOTOGRAPHIC SHUTTER WITH SWING-THROUGH SHUTTER BLADES
Filed May 12, 1965 — 4 Sheets-Sheet 4

INVENTOR.
Franz W. R. Starp
BY Arthur A. March
ATTORNEY

United States Patent Office 3,357,333
Patented Dec. 12, 1967

3,357,333
PHOTOGRAPHIC SHUTTER WITH SWING-THROUGH SHUTTER BLADES
Franz W. R. Starp, Calmbach, Germany, assignor to Prontor-Werk Alfred Gauthier G.m.b.H., Calmbach (Enz), Germany, a corporation of Germany
Filed May 12, 1965, Ser. No. 455,126
Claims priority, application Germany, May 15, 1964, G 40,610
7 Claims. (Cl. 95—61)

ABSTRACT OF THE DISCLOSURE

A photographic shutter having shutter blades swinging-through in one direction from a first closed position to an open position and to a second closed position. The shutter has swinging-through shutter blades, a driving lever and a rotatably mounted shutter blade operating ring. Pivotable means are provided for connecting the shutter blades to the ring whereby the blades swing through from a first closed position to an open position then to an alternate closed position as the ring rotates in one direction, and from the alternate closed position to the open position and then to the first closed position as the ring rotates in the opposite direction. A stirrup comprising first and second legs is connected to the driving lever for actuation thereby and is guided to move with respect to the ring. First and second control pawls are pivotally connected to the ring to engage respectively and alternately the first and second legs whereby successive running down of said driving lever from the cocked position moves the stirrup in one direction causing the first leg to move the first pawl and thereby rotate the rim in one direction and then the second leg to move the second pawl and thereby rotate the ring in the opposite direction.

---

The present invention relates to a photographic shutter having shutter blades that swing through in one direction from a first closed position to the open position to a second closed position. The shutter of this invention includes a driving lever that can be manually cocked and a reversing mechanism associated with the driving lever to actuate a blade driving ring connected to the swing-through blades to permit these blades to be swung completely through in one direction from closed to open to closed positions and then in the reverse direction from closed to open to closed positions.

Swing-through shutter blades have been known heretofore in a mechanism provided with a double pawl which is arranged to achieve a pulling effect and which cooperates with a fixed reversing and transmission lever in such a way that the lever is once moved to the left and the next time to the right. The reversing and transmission lever of this prior arrangement is connected with a blade operating ring that drives the swing-through shutter blades. It has also been known heretofore to provide a shutter arrangement with double pawls acting directly on the blade operating ring, these double pawls being formed with two scissors-like connected levers having free ends articulately connected, both rotatably and deflectably to a tension pawl cooperating with the blade driving ring. Both of these prior arrangements have deficiencies. For example, they require a comparatively large number of parts to make up the reversing mechanism and are therefore complicated to manufacture and are prone to be troublesome in use.

The problem solved by the present invention is basically the overcoming of the disadvantages of prior shutter arrangements by means of an alternately movable blade operating ring, that is, a ring in which pressure is transmitted alternately in opposite directions. In accordance with the present invention a simplified structure results which makes the shutter easier to manufacture and more dependable in operation.

In accordance with this invention the shutter includes a U-shaped pushed stirrup, or frame, which is articulately connected to the driving lever and is provided with two legs extending parallel to each other and guided on opposite sides of a central light-transmitting channel of the shutter. The legs of the stirrup alternately cooperate with controlling pawls pivotally arranged on the shutter blade operating rings at points diametrically spaced about the optical axis of the shutter mechanism. A substantial advantage of the blade drive proposed according to the present invention is the reduction in the number of parts required to make up the mechanism while in turn is primarily, although not exclusively, due to the one piece stirrup and to the fact that the motion of the stirrup can be transmitted directly to the blade operating ring. As a consequence the use of reversing transmission levers moved on fixed pivots is avoided.

An embodiment that has been found to be particularly advantageous includes controlling pawls articulately arranged on the blade operating ring at one end and each provided with a driving pin at the other end which can be operatively connected to a particular leg of the stirrup by means of a spring that forces the pin into engagement with a driving claw on the respective leg.

In order to avoid the necessity of providing additional means to set the position of the control pawls, another provision of the invention is that the control pawls be so constructed and so located on the blade operating ring that the particular control pawl not in operation for any given exposure be moved outwardly by centrifugal force to a position in which the driving pin on that pawl is outside the path of motion of the driving claw of the associated leg.

A further feature of the invention is that there is associated with each control pawl a spring switch which is fixedly positioned and which, during the running down of the exposure, pushes the particular control pawl that is not being used out of the path of motion of the driving claw that would otherwise actuate that pawl.

The invention will now be described in detail by way of a self-cocking shutter in the following specification together with the drawing in which.

Figure 1:
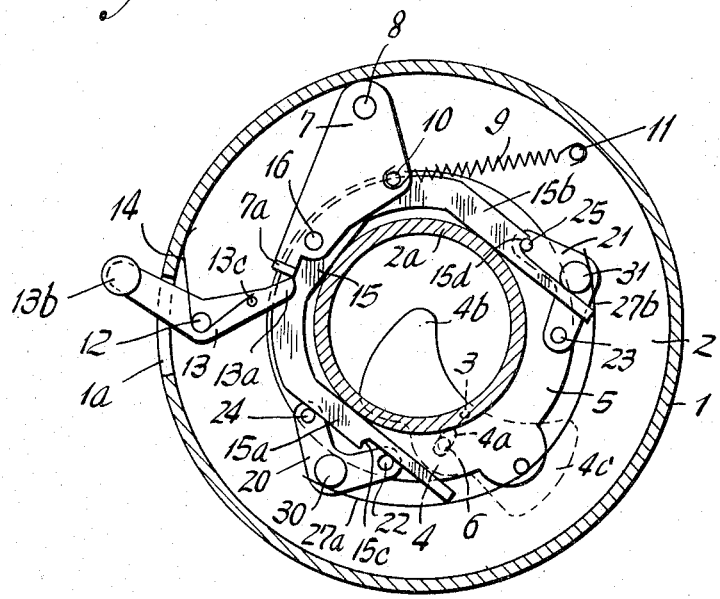
FIG. 1 shows the shutter in its inoperative position with the cover plate removed and the blade operating ring in an end position.
Figure 2:
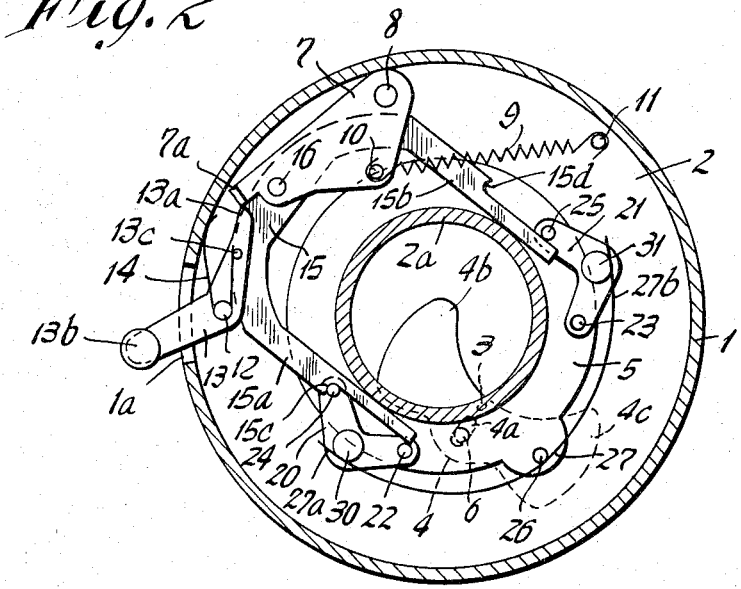
FIG. 2 shows the same shutter during the cocking process and immediately prior to the release of the driving lever by the cocking and release lever.
Figure 5:
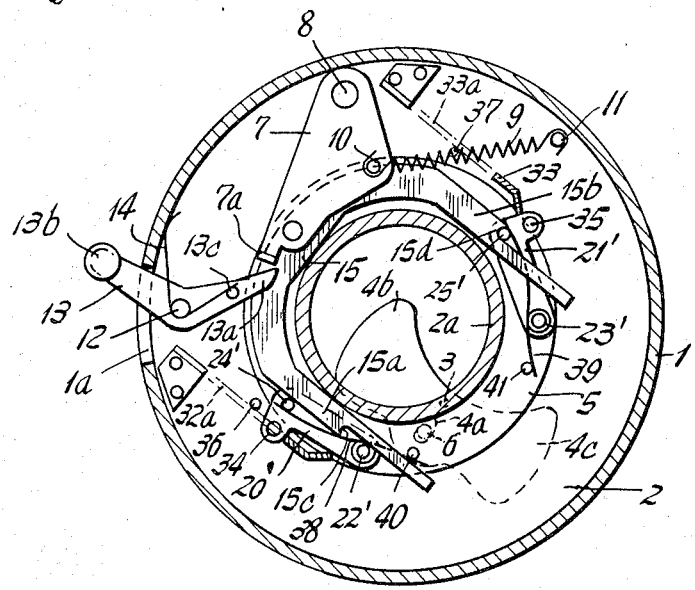
FIGS. 5 to 8 show a modified form of a photographic self-cocking shutter with spring switches for alternately disconnecting the control pawls, the shutter being shown in successive postions corresponding to those illustrated in FIGS. 1 to 4.
Figure 6:
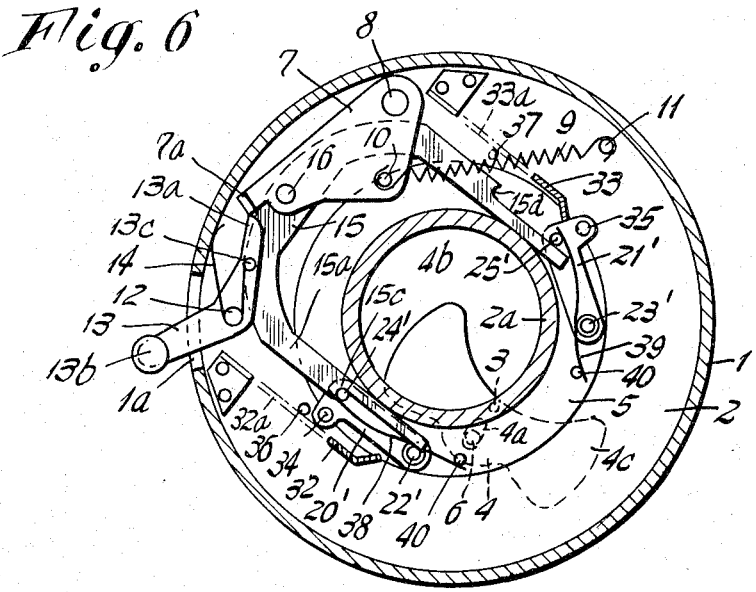

The drawing shows the housing 1 of a photographic self-cocking shutter with a base plate 2 surrounding a tubular opening, or socket, 2a in which the objective lens of the camera may be supported. Fixed hinge pins 3 are attached between the base plate 2 and the bottom of the housing 1 to support double-ended shutter blades 4. In order to simplify the drawing as much as possible, only one of the pins 3 and shutter blades 4 have been shown. The shutter blades 4 follow a swinging-through motion under the force of a shutter operating ring 5 which is rotatably mounted on the socket 2a and is provided with pins 6 that engage slots 4a in each of the blades 4. During its rotation the ring 5 causes the shutter blades to swing from a closed postion as shown in FIG. 1 and FIG. 5 through an open position to a closed position. Each of the shutter blades has two sections identified by reference characters 4b and 4c, and the operation of the shutter begins with one of the sections for each of the blades located so as to close off the shutter aperture and ends with the other sections of the blades closing off the shutter aperture.

The ring 5 is driven by means of a one-armed driving lever 7 rotatably mounted on a pin 8 in the base 2. The lever is actuated by a driving spring 9 which is connected between a pin 10 on the lever 7 and a pin 11 affixed to the base 2 to urge the lever 7 to rotate counterclockwise. In order to make an exposure, the driving spring 9 must first be placed under increased tension by means of a cocking and release lever 13 pivotally mounted on a pin 12. For this purpose, the lever 13 has a arm 13a which cooperates with a bent-off arm 7a of the driving lever 7 and a second arm 13b which serves as a fingerpiece or actuator for the shutter and extends through a slot 1a in the side wall of the shutter housing. The cocking and release lever 13 is kept in the starting position by means of a spring 14, one end of which presses against a pin 13c and the other end against the side wall of the shutter housing to force the lever 13 against one of the limiting edges of the slot 1a.

In order to transmit the force of the driving spring 9 to the blade operating ring 5, the invention provides for a U-shaped push stirrup 15, which is articulately connected to the driving lever 7 by means of a pivot pin 16 and which is provided with two parallel legs 15a and 15b. The pin 16 is so arranged at the free end of the driving lever 7, with respect to the bearing pin 8, that the stirrup 15 moves approximately rectilinearly and radially during the motion of the driving lever. The purpose of the push stirrup 15 is to drive the ring 5 first in one direction of rotation and, during a subsequent exposure, in the opposite direction. The stirrup 15 has two legs 15a and 15b which engage the outer circumference of the socket 2a to guide the stirrup in a radial direction according to the direction of motion of the pin 16. This is what causes the stirrup 15 to move approximately rectilinearly during the exposure run-down. If necessary, the slightly curved, or arcuate, path of motion of pin 16 during the exposure run-down could be transformed into a purely rectilinear motion of the stirrup 15 by providing the stirrup with a pin or pivot guided in a straight groove extending radially with respect to the axis of the shutter and fitting into a transverse slot in the driving lever 7. Control pawls, which will be described in greater detail hereinafter, are mounted on the blade operating ring 5 and are associated with the two legs 15a and 15b of the stirrup to make it possible to transmit the transverse, or shearing, motion of the stirrup to the blade operating ring 5 for the purpose of obtaining, alternately, counterclockwise and clockwise rotary motion of the ring 5.

A pair of lever-like control pawls 20 and 21 shown in FIGS. 1 through 4 are components of the foregoing mechanism and are pivotally mounted on the ring 5 by means of pivot pins 22 and 23. At their free ends the control pawls 20 and 21 carry, respectively, driving pins 24 and 25, each of which cooperates with a driving claw 15c and 15d on the respective legs 15a and 15b of the stirrup. In order to obtain alternation of the drive of the ring 5, the control pawls 20 and 21, or the driving pins 24 and 25, are arranged on diametrically opposite sides of the socket 2a. A spring 27 attached to a pin 26 is connected to the ring 5 and is situated so as to provide force on the pawls 20 and 21 to bring the proper driving pin 24 or 25 into engagement with the corresponding leg 15a and 15b and to keep the pin in engagement with the leg at the proper time.

In order to assure proper operation of the mechanism, it is necessary to displace the control pawl 20 or 21 which is not at the time, participating in the drive of ring 5 in order that its driving pin 24 or 25 be outside the path of motion of the driving claw 15c or 15d. This may be accomplished in various ways. For example, it is possible to utilize the centrifugal force occurring during the rotation of the ring 5 by arranging the pawls 20 and 21 in such a way that, during the running-down motion of the ring 5, the control pawl that is not engaged (the free pawl) is flung outwardly by centrifugal force against the action of the spring 27. As a result the corresponding driving claw 15c or 15d is unable to engage the driving pin 24 or 25 during the exposure rundown. As is illustrated in FIGS. 1 through 4, additional centrifugal weights 30 and 31 may be provided, for example, in the shown form of small lead plates or the like, if this should prove to be necessary for increasing the mass to increase the centrifugal force operating on the pawls.

FIGS. 5 to 8 show another embodiment for keeping the control pawl that is not participating in the drive of the blade operating ring 5 out of the path of motion of the respective driving claw 15c or 15d. In this embodiment a fixed spring switch is associated with each of the two control pawls 20' and 21' which are rotatably positioned on the pins 22' and 23' on the blade operating ring. These spring switches may be formed as leaf springs 32 and 33 which cooperate with a pair of guide rivets 34 and 35 located at the free end of the respective control pawls 20' and 21'. One end of each of the leaf springs 32 and 33 can be attached to the base plate 2 and may engage a pair of fixed pins 36 and 37 with their other free ends bent off inwardly. As a result, the guide rivet 34 or 35 of the respective control pawl 20' and 21' that is not participating in the drive of the blade operating ring 5 slides along the outside of the leaf spring 32 or 33 to thereby impart a corresponding rotation to the control pawl. In addition, each of the leaf springs 32 and 33 has a passageway 32a and 33a, respectively, for the guide rivets 34 and 35 associated with the respective leaf spring. This arrangement permits that control pawl 20' or 21' which is being deflected to return at the end of the exposure run-down to its starting position due to the force of a spring 38 or 39, thereby causing the driving pin 24' or 25' that is moved into operative position to engage the corresponding leg 15a or 15b. One end of each of the springs 38 and 39 abuts against the driving pin 24' and 25' of the control pawl, while the other end bears against a pin 40 and 41, respectively, on the blade operating ring 5.

Figure 3:
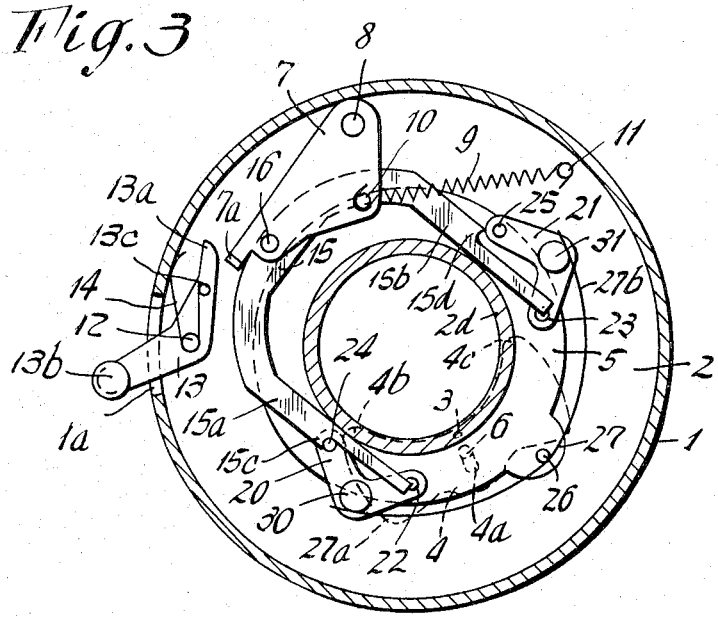
FIG. 3 shows the shutter during the running down of the exposure with the blade operating ring pivoting counterclockwise under the force of the stirrup.
Figure 4:
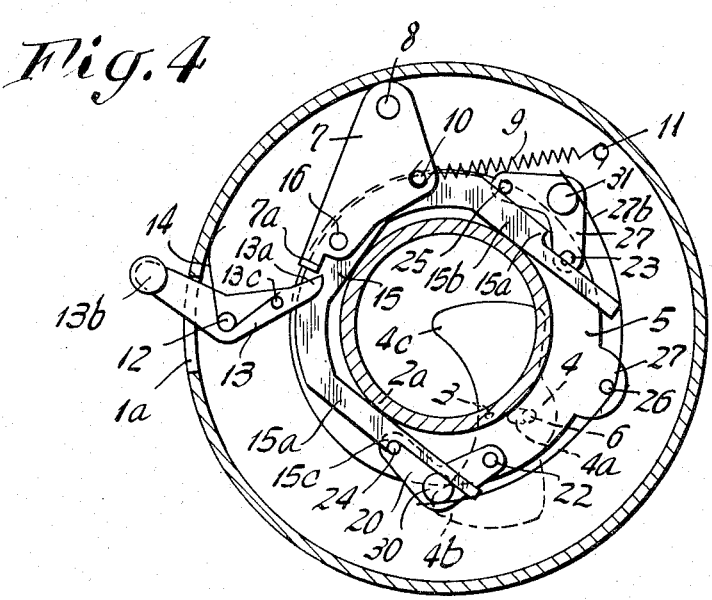
FIG. 4 shows the position of the components of the shutter after the exposure has been concluded and with the shutter blade occupying its alternative closed position.
Figure 7:
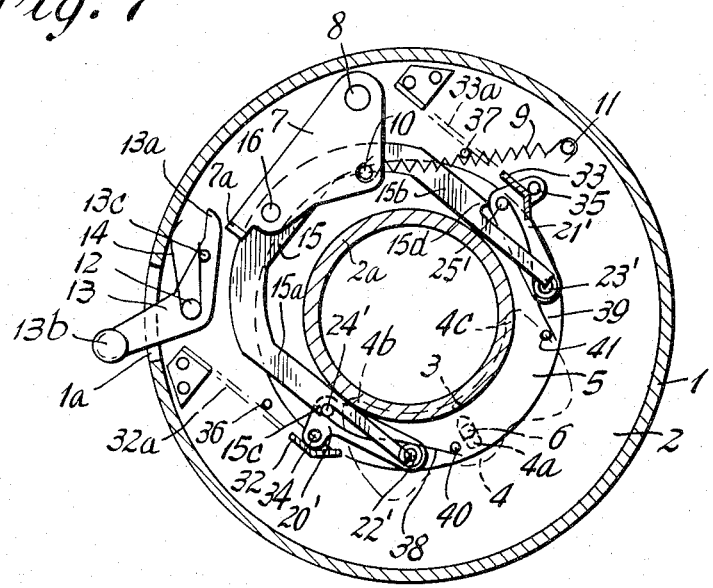
Figure 8:
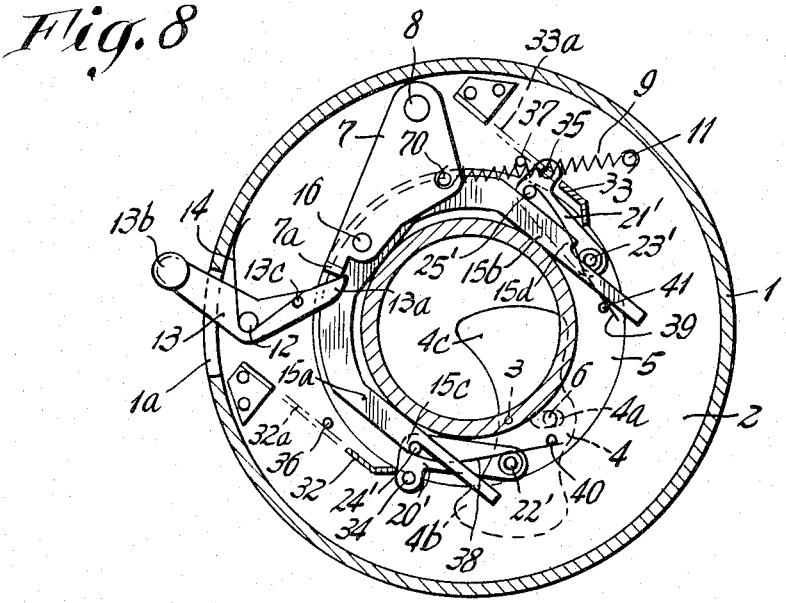

The above-described self-cocking shutter operates as follows:

Proceeding from the starting position of the shutter illustrated in FIGS. 1 and 5, the operator who desires to carry out an exposure and has previously set the exposure parameters, need only depress the cocking and release lever 13, i.e., to move it counterclockwise from the position shown in FIGS. 1 and 5. This causes the driving lever 7 to rotate about the bearing pin 8 to increase tension on the driving spring 9. The driving lever 7 and the push stirrup 15 articulately connected thereto finally reach the position shown in FIGS. 2 and 6 in which one of the driving pins 24 or 25 in FIG. 2 or one of the pins 24' or 25' in FIG. 6 of the appropriate control pawl 20 or 21 or 20' or 21' engages one of the driving claws 15c or 15d of the push stirrup 15 due to the action of the spring 27 in FIG. 2 or spring 38 or 39 in FIG. 6. In the further course of the cocking motion, the arm 13a finally releases the driving lever 7 which, because of the pull of the driving spring 9, instantaneously carries out a return motion and thereby drives the blade operating ring by means of the push stirrup 15 and of whichever control pawl 20 or 21 of FIG. 2 or the pawl 20' or 21' of FIG. 6 becomes operative. Thereby the blade operating ring 5 rotates in one direction. The swinging-through blades 4 also move and, as shown in FIGS. 3 and 7, release the light transmitting aperture of the shutter for a specific exposure time depending on the exposure-time setting.

In the above-described exposure run-down, that control pawl 21 or 21' which does not participate in the momentary drive of the blade operating ring 5 is maintained out of the path of motion of the driving claw 15c or 15d of the push stirrup 15 associated with said pawl. In the structure illustrated in FIGS. 1 to 4, this occurs because the control pawl 20 or 21 executes a rotary motion about the articulated pin or pivot 22 or 23 as a result of the centrifugal force caused by the running down of the blade operating ring 5. As a consequence, the driving pin 24 or 25 cannot be engaged by the oncoming driving claw 15c or 15d of the push stirrup 15.

In the embodiment of the invention illustrated in FIGS. 5 to 8, that control pawl 20' or 21' which does not participate in the momentary drive of the blade operating ring 5 is displaced. This action takes place because rivet 34 or 35 slides along the outside of the leaf spring 32 or 33 which causes the control pawl 20' or 21' to move in a radially, outwardly directed rotary motion (see FIG. 7). At the end of the exposure run-down, the guide rivet 35 of the control pawl 20' or 21' reaches the passageway 32a or 33a of the leaf spring 32 or 33 and passes therethrough. As a consequence, due to the action of the spring 38, the driving pin 24' or 25' is again able to engage the outer edge of the leg 15a or 15b of the push stirrup 15.

During the subsequent exposure run-down, the above described sequence is repeated, however, with the difference that the push stirrup 15 now engages that control pawl which was inoperative during the preceding exposure process.

It is to be understood that the reversing mechanism hereinbefore described is not limited in any way to self-cocking shutters but may instead be used for the same purpose and the same advantageous results in all other kinds of photographic shutters having swinging-through blades.

While there has been described what is at present considered to be various preferred embodiments of this invention, it will be obvious to those skilled in the art that various changes and modifications may be made therein without departing from the invention and it is, therefore, aimed to cover all such changes and modifications as fall within the true spirit and scope of the invention as defined in the appended claims.

What is claimed is:

1. A photographic shutter comprising: swinging-through shutter blades; a driving lever; a rotatably mounted shutter blade operating ring; pivotal means connecting said shutter blades to said ring whereby said blades swing through from a first closed position to an open position to an alternate closed position as said ring rotates in one direction and from said alternate closed position to said open position to said first closed position as said ring rotates in the opposite direction; a stirrup connected to said driving lever to be actuated thereby and guided to move with respect to said ring and comprising first and second legs; first and second control pawls pivotally connected to said ring to engage, respectively and alternately, said first and second legs, whereby successive running down of said driving lever from the cocked position moves said stirrup in one direction causing said first leg to move said first pawl and thereby rotate said ring in one direction and then said second leg to move said second pawl and thereby rotate said ring in the opposite direction.

2. The shutter of claim 1 in which said shutter comprises a central socket and said legs are guided on opposite sides of said socket and said pawls are diametrically opposite on sides of said socket.

3. The shutter of claim 1 comprising, in addition: a first driving pin extending from said first pawl and a second driving pin extending from said second pawl; first and second claws on said first and second legs to engage said first and second driving pins, respectively; and spring means for pressing said first and second driving pins toward said first and second legs.

4. The shutter of claim 3 in which said spring means comprises a single spring having its opposite ends exerting force on said pawls.

5. The shutter of claim 3 in which said spring means comprises first and second springs exerting force on said first and second pawls, respectively.

6. The shutter of claim 3 in which said pawls comprise weights to cause said first pawl to swing said first pin out of the path of said first claw when said second pin is in position to engage said second claw and to cause said second pawl to swing said second pin out of the path of said second claw when said first pin is in position to engage said first claw.

7. A photographic shutter comprising: swinging-through shutter blades; a driving lever; a shutter blade operating ring; a central socket, said ring being rotatably mounted around said socket; pivot means connecting said blades to said ring to swing said blades from closed to open to closed position as said ring rotates in one direction and to swing said blades back from closed to open to closed position as said ring rotates in the opposite direction; a stirrup connected to said driving lever to be moved thereby and comprising first and second legs guided on opposite sides of said socket to limit the motion of said stirrup to a substantially radial direction with respect to said ring; first and second claws on said first and second legs; first and second pawls pivotally connected at one end to said ring on diametrically opposite sides of said socket; first and second spring switches adjacent to said first and second pawls, respectively, to guide said first and second pawls alternately out of the path of motion of said legs to permit only one of said pawls at a time to be actuated by the corresponding one of said legs; first and second pins on said first and second pawls to engage said first and second claws, respectively and alternately; and spring means engaging said pawls to press both of said pins toward their respective claws.

References Cited

UNITED STATES PATENTS 473,356    4/1892    Servus _____ 95—61

JOHN M. HORAN, *Primary Examiner.*